United States Patent

Yamamoto

(10) Patent No.: US 10,414,618 B2
(45) Date of Patent: Sep. 17, 2019

(54) FILM TRANSFER TOOL

(71) Applicant: PLUS CORPORATION, Minato-ku, Tokyo (JP)

(72) Inventor: Yasuhiro Yamamoto, Tokyo (JP)

(73) Assignee: Plus Corporation, Tokyo (JP)

( * ) Notice: Subject to any disclaimer, the term of this patent is extended or adjusted under 35 U.S.C. 154(b) by 0 days.

(21) Appl. No.: 16/039,254

(22) Filed: Jul. 18, 2018

(65) Prior Publication Data

US 2019/0039850 A1 Feb. 7, 2019

(30) Foreign Application Priority Data

Aug. 1, 2017 (JP) .................. 2017-148795

(51) Int. Cl.
B32B 43/00 (2006.01)
B65H 37/00 (2006.01)
B32B 38/10 (2006.01)

(52) U.S. Cl.
CPC ............ *B65H 37/007* (2013.01); *B32B 38/10* (2013.01); *B32B 43/006* (2013.01); *Y10T 156/1174* (2015.01); *Y10T 156/1195* (2015.01); *Y10T 156/1978* (2015.01); *Y10T 156/1994* (2015.01)

(58) Field of Classification Search
CPC . B32B 38/10; B32B 43/006; Y10T 156/1174; Y10T 156/1195; Y10T 156/1978; Y10T 156/1994
USPC .......... 156/715, 719, 759, 764, 767
See application file for complete search history.

(56) References Cited

U.S. PATENT DOCUMENTS

| 5,785,437 | A | * | 7/1998 | Koyama | B65H 37/007 156/540 |
| 6,062,286 | A | * | 5/2000 | Koyama | B65H 37/007 118/257 |
| 6,702,491 | B2 | * | 3/2004 | Kobayashi | B65H 37/007 400/207 |
| 6,830,089 | B1 | * | 12/2004 | Tamai | B65H 37/007 118/257 |
| 7,121,948 | B2 | * | 10/2006 | Huthmacher | B65H 37/007 464/41 |

(Continued)

FOREIGN PATENT DOCUMENTS

JP 2010-284922 A 12/2010

Primary Examiner — Mark A Osele
Assistant Examiner — Nickolas R Harm
(74) Attorney, Agent, or Firm — The Marbury Law Group, PLLC

(57) ABSTRACT

A film transfer tool has a case main body, a supply bobbin drive shaft driving a supply bobbin holding an unused transfer tape therearound, a take-up bobbin drive shaft driving a take-up bobbin taking up a used portion of the transfer tape therearound, a rotational coupling mechanism coupling the supply bobbin drive shaft and the take-up bobbin drive shaft together rotationally, and a reverse rotation preventive mechanism preventing a reverse rotation of the rotational coupling mechanism. The reverse rotation preventive mechanism has a rolling gear coupled to a rotational system made up of the supply bobbin drive shaft, the take-up bobbin drive shaft and the rotational coupling mechanism, moving gears moving over a predetermined range around the rolling gear and meshing with the rolling gear, and locking projections disposed to confront a reverse rotating direction of the rolling gear to lock the moving gears.

6 Claims, 4 Drawing Sheets

(56) References Cited

U.S. PATENT DOCUMENTS

| | | | | |
|---|---|---|---|---|
| 7,163,040 B2* | 1/2007 | Marschand | ......... | B65H 37/007 |
| | | | | 118/200 |
| 7,325,583 B2* | 2/2008 | Watanabe | ............ | B65H 37/007 |
| | | | | 118/200 |
| 7,776,173 B2* | 8/2010 | Schumacher | ........ | B65H 37/007 |
| | | | | 156/230 |
| 8,347,933 B2* | 1/2013 | Narita | ................. | B43L 19/0068 |
| | | | | 156/540 |
| 8,746,313 B2* | 6/2014 | Kropp | .................. | B65H 37/007 |
| | | | | 156/523 |
| 9,969,590 B2* | 5/2018 | Fujisawa | .............. | B65H 37/007 |
| 2008/0083487 A1* | 4/2008 | Moss | ................ | B65H 35/0026 |
| | | | | 156/250 |
| 2010/0084095 A1* | 4/2010 | Sekiya | ................ | B65H 37/007 |
| | | | | 156/378 |
| 2011/0120659 A1* | 5/2011 | Narita | ................ | B43L 19/0068 |
| | | | | 156/577 |
| 2015/0183238 A1* | 7/2015 | Kano | .................... | B41J 11/703 |
| | | | | 347/218 |
| 2016/0041345 A1* | 2/2016 | Kamouchi | ........... | G02B 6/3866 |
| | | | | 15/97.1 |
| 2017/0247792 A1* | 8/2017 | Kobashi | .............. | C23C 16/0227 |

\* cited by examiner

FILM TRANSFER TOOL

CROSS-REFERENCE TO RELATED APPLICATION

This patent application is based upon and claims the benefit or priority under 35 USC 119 of the prior Japanese Patent Application No. 2017-148795 filed on Aug. 1, 2017, the entire contents of which, including the description, claims, drawings and abstract, are incorporated herein by reference.

BACKGROUND OF THE INVENTION

Field of the Invention

The present invention relates to a film transfer tool including a reverse rotation preventive mechanism.

Description of the Related Art

Conventionally, film transfer tools normally include a reverse rotation preventive mechanism for restricting a reverse rotation of a supply bobbin or a take-up bobbin that rotates forwards when in use. In general, a reverse rotation preventive mechanism is made up of a ratchet pawl and ratchet teeth. Some users find unfavorable flicking noise made when ratchet teeth flick a ratchet pawl. To cope with this, there have been disclosed film transfer tools in which the flicking noise is quietened using various configurations. For example, a film transfer tool described in Japanese Patent No. 5394829 provides a reverse rotation preventive mechanism including a conventional drive gear and a driven gear that meshes with the drive gear. In this reverse rotation preventive mechanism, a tooth surface of one side of the drive gear that is formed into a normal involute curved surface abuts with a gear surface of one side of the driven gear that is also formed into an involute curved surface when the drive gear rotates forwards. Then, when the drive gear rotates backwards, an outer circumferential surface of the driven gear is guided by a locking portion made up of a sloping surface that slopes upwardly in a forward rotating direction and a surface that is straight in a radial direction on a tooth surface on the other side of the drive gear, whereby a reverse rotation is prevented.

In the film transfer tool of Japanese Patent No. 5394829, a drive shaft of a supply bobbin and a drive shaft of a take-up bobbin are coupled together rotationally by way of an intermediate gear that meshes with the drive gear and a gear that is provided on a take-up bobbin drive shaft that meshes with the intermediate gear. Then, to make up the reverse rotation preventive mechanism, one surface of a gear tooth of the drive gear is formed into an involute curve, and a locking portion is formed on the other surface. Similarly, one surface of a gear tooth of the driven gear is also formed into an involute curve, and the other surface is formed straight. Consequently, it is necessary to take it into consideration that a gear (the intermediate gear in Japanese Patent No. 5394829) that is coupled to this drive gear should have a shape that prevents the gear from being locked on the locking portion of the drive gear. To make this happen, the gear should be designed specially, which makes a gear tooth profile complex, thereby making it difficult to fabricate such a gear from time to time.

SUMMARY OF THE INVENTION

An object of the invention is to provide a film transfer tool including a reverse rotation preventive mechanism that does not have to have a complex gear tooth profile to thereby facilitate a fabrication of a gear.

According to an aspect of the invention, there is provided a film transfer tool having a case main body, a supply bobbin drive shaft provided in the case main body and configured to drive a supply bobbin around which an unused transfer tape is wound, a take-up bobbin drive shaft provided in the case main body and configured to drive a take-up bobbin around which a used portion of the transfer tape is wound, a rotational coupling mechanism configured to couple the supply bobbin drive shaft and the take-up bobbin drive shaft together rotationally, and a reverse rotation preventive mechanism configured to prevent a reverse rotation of the rotational coupling mechanism, wherein the reverse rotation preventive mechanism has a rolling gear configured to be coupled to a rotational system made up of the supply bobbin drive shaft, the take-up bobbin drive shaft and the rotational coupling mechanism, a moving gear disposed so as to move over a predetermined range defined around the rolling gear and configured to mesh with the rolling gear, and a locking projection disposed to confront a reverse rotating direction of the rolling gear and configured to be locked on the moving gear.

According to the invention, since the gear tooth made up of the normal involute curve can be used, it is possible to provide the film transfer tool including the reverse rotation preventive mechanism that facilitates the fabrication of the gear.

DETAILED DESCRIPTION OF THE PREFERRED EMBODIMENT

Figure 1A:
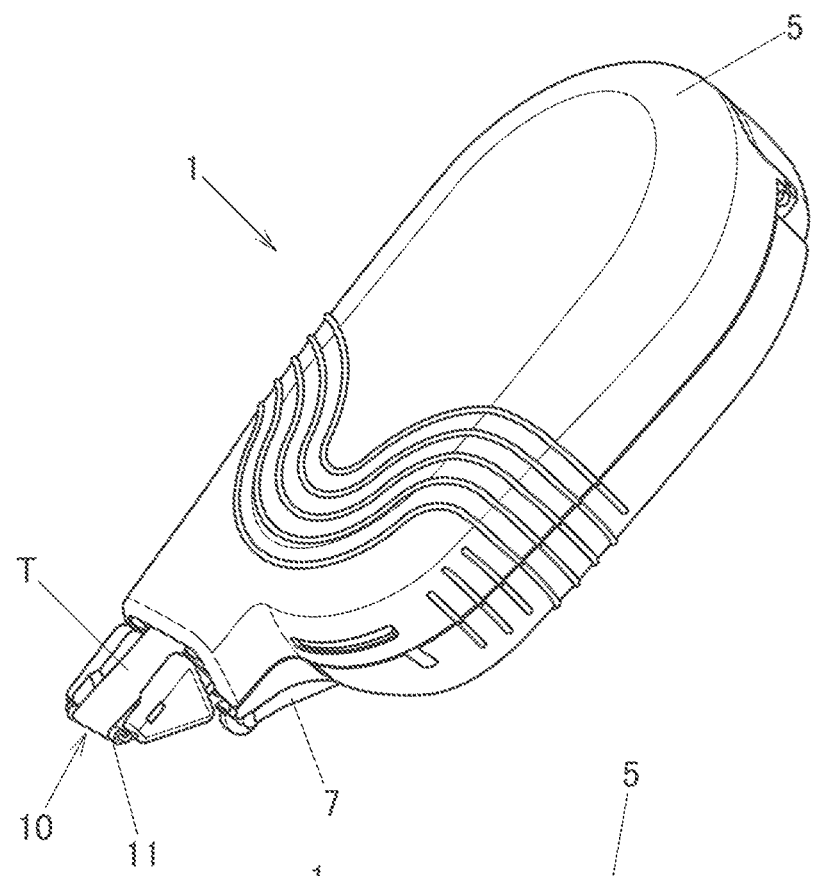
FIG. 1A is a perspective view showing a film transfer tool according to an embodiment of the invention, as seen from a front thereof.
Figure 1B:
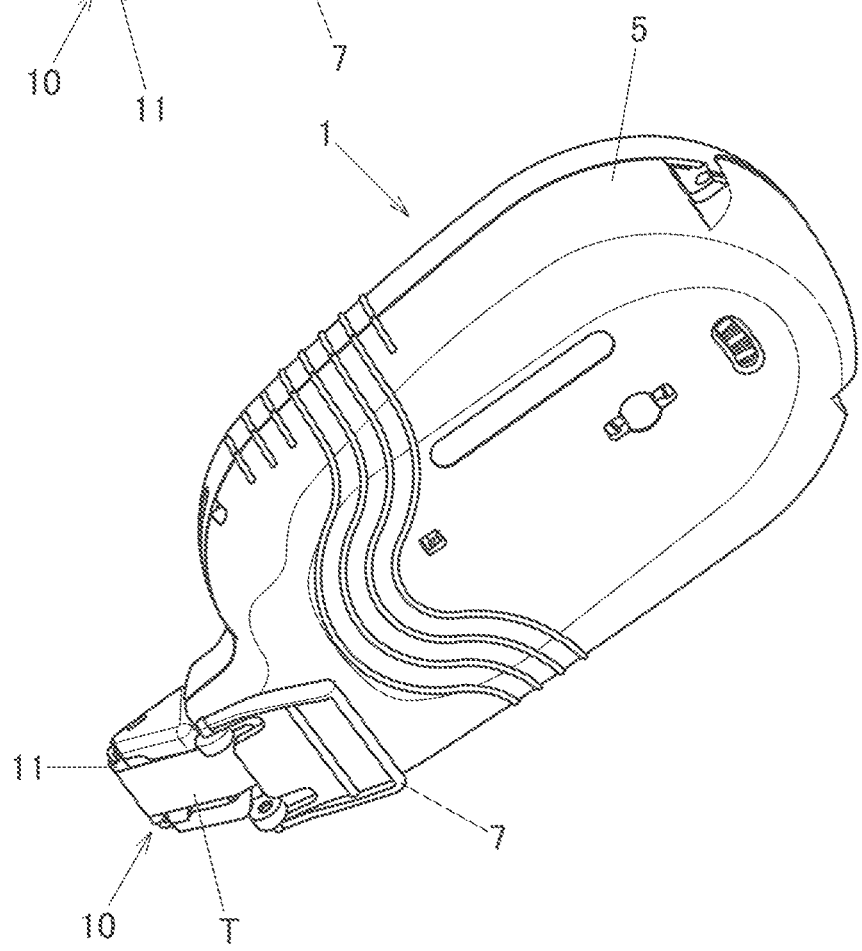
FIG. 1B is a perspective view showing the film transfer tool according to the embodiment of the invention, as seen from a back thereof.

Next, an embodiment of the invention will be described based on drawings. As FIGS. 1A, 1B show, a film transfer tool 1 includes a transfer tape T that is a so-called correction tape, and this transfer tape T is pressed against a transfer intended surface by a transfer head 10, whereby a transferable layer of the transfer tape T is transferred to the transfer intended surface. The film transfer tool 1 is disposed so that a flat surface of a case main body 5 and a surface of the transfer tape T at the transfer head 10 become parallel to each other. A cap 7 is provided at a portion of the case main body 5 that lies in the vicinity of the transfer head 10 that projects from the case main body 5. The cap 7 is provided rotationally, and when the cap 7 is rotated towards the transfer head 10, the cap 7 can cover a transfer roller 11 of the transfer head 10.

In the following description, an end of the film transfer tool 1 where the transfer head 10 is provided will be referred to as front, and an opposite end will be referred to as rear. Additionally, in such a state that the film transfer tool 1 is disposed in such a way that the transfer head 10 is positioned upper with a shift of the transfer roller 11 directed in an up-and-down direction, a side of the film transfer tool 1 that constitutes a left side when the film transfer tool 1 is seen from the rear towards the front will be referred to as left, a side constituting a right side will be referred to as right, a side constituting an upper side will be referred to as top or up, and a side constituting a lower side will be referred to as bottom or down.

Figure 2:
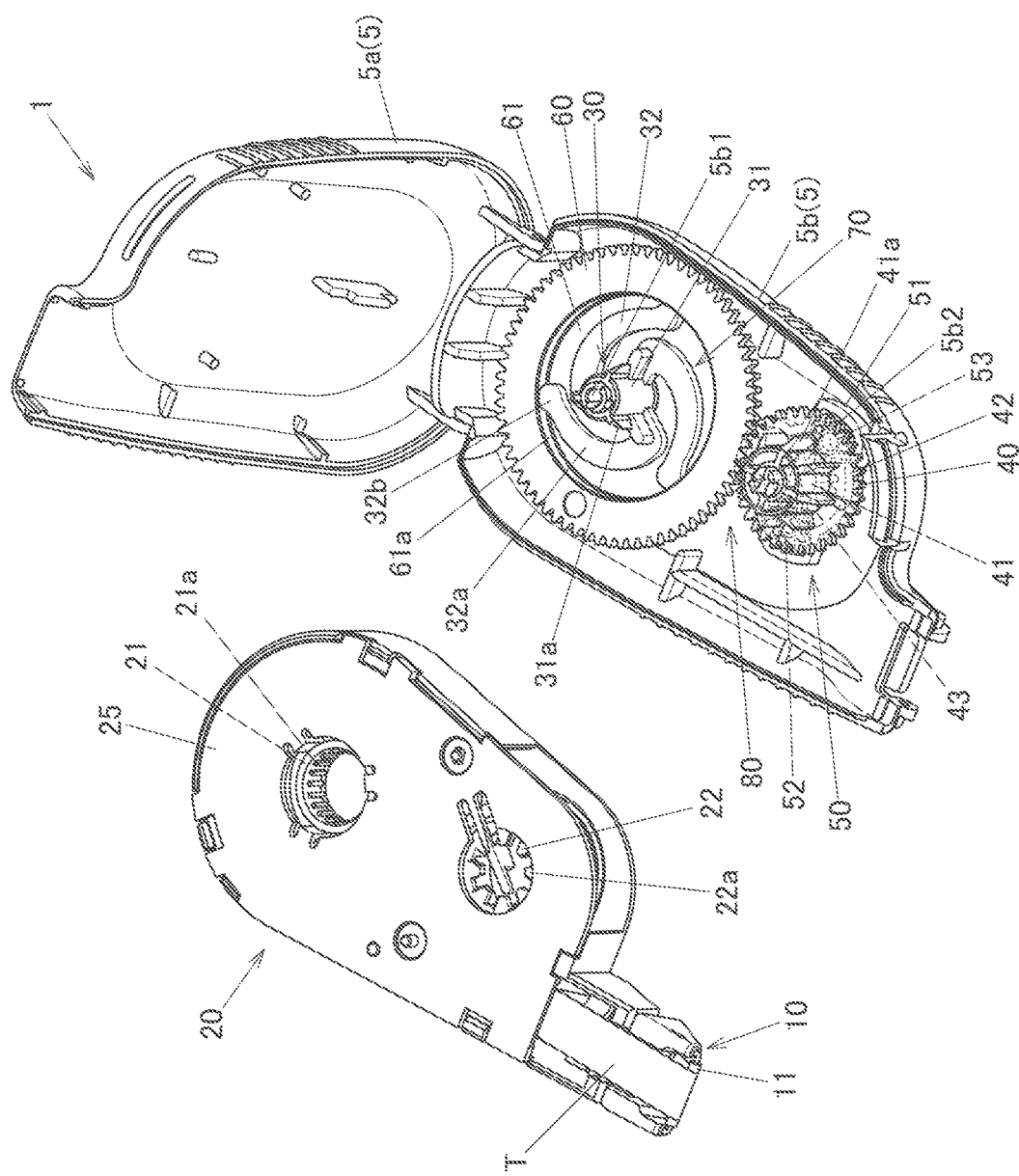
FIG. 2 is a perspective view of the film transfer tool according to the embodiment of the invention showing a state in which a case main body of the film transfer tool and a refill are separated from each other.

As FIG. 2 shows, the case main body 5 is divided laterally into a left case 5a and a right case 5b, and the left case 5a and the right case 5b are connected together at rear ends thereof by a hinge. This hinge connection allows the case main body 5 to be opened, and a refill 20 accommodated in an interior of the case main body 5 can be removed therefrom.

The refill 20 includes the transfer head 10 at a front end of a refill case 25. The refill 20 includes a supply bobbin 21 around which an unused transfer tape T is wound and a take-up bobbin 22 that takes up the used transfer tape T therearound in an interior of the refill case 25. The supply bobbin 21 and the take-up bobbin 22 are both disposed so that their rotational shafts are directed in a left-and-right direction.

Consequently, the transfer tape T that is wound around the supply bobbin 21 is passed over the transfer roller 11 of the transfer head 10 after the transfer tape T is twisted through 90 degrees within the refill case 25. Then, the used transfer tape T whose transferable layer has been transferred to a transfer intended surface is twisted again through 90 degrees to its original disposition within the refill case 25 and is then taken up by the take-up bobbin 22.

A supply-side support shaft 5b1 is erected at the rear of an inner surface of the right case 5b of the case main body 5. A take-up-side support shaft 5b2 is erected at the front of the inner surface of the right case 5b. The supply-side support shaft 5b1 and the take-up-side support shaft 5b2 both have a substantially cylindrical shape and a slit formed therein. A supply-side gear 60 is provided rotatably on the supply-side support shaft 5b1. The supply-side gear 60 has a circular recess portion 61 formed around an axis thereof. Further, a supply-side drive shaft member 30 is provided rotatably on the supply-side support shaft 5b1 so as to be superposed on the supply-side gear 60. The supply-side drive shaft member 30 is made up of a cylindrical supply bobbin drive shaft 31 and a clutch spring portion 32 that makes up a clutch device 70 (a clutch mechanism), which will be described later. The supply bobbin drive shaft 31 has three ribs 31a that are formed radially on an outer circumference thereof. These ribs 31a are brought into engagement with irregular portions 21a that are formed on a shaft inner circumferential surface of the supply bobbin 21, whereby a tension from the transfer tape T is transmitted to the supply bobbin drive shaft 31 via the supply bobbin 21 when in use.

The supply-side support shaft 5b1 is inserted into the supply bobbin drive shaft 31, and then, the slit in the supply-side support shaft 5b1 is elastically expanded radially outwards, whereby the supply-side drive shaft member 30 and the supply-side gear 60 are prevented from being dislocated. Further, three arc-shaped spring portions 32a are formed around a base portion of the supply bobbin drive shaft 31 so as to extend radially, so that protuberant distal end portions 32b of the spring portions 32a are elastically pressed against an inner circumferential wall 61a of the recess portion 61 of the supply-side gear 60. In this configuration, when the supply-side drive shaft member 30 is rotated with a rotational force that exceeds a predetermined rotational force, the distal end portions 32b of the clutch spring portions 32 slide on the inner circumferential surface 61a of the supply-side gear 60, whereby a clutch is activated to operate. Namely, the clutch device 70 is made up of the clutch spring portions 32 and the recess portion 61. In the film transfer tool 1, an amount by which the take-up bobbin 22 takes up the transfer tape T is set greater than an amount by which the supply bobbin 21 feeds out the transfer tape T. Then, an excess amount of the take-up amount over the feed-out amount is controlled as required by an action of the clutch device 70. In other words, a difference in the number of rotations between the supply bobbin 21 and the take-up bobbin 22 is controlled as required by the clutch device 70.

A take-up-side drive shaft member 40 is provided rotatably on the take-up-side support shaft 5b2. The take-up-side drive shaft member 40 includes a substantially cylindrical take-up bobbin drive shaft 41, a take-up-side gear 42 that is provided at a base portion of the take-up-side bobbin drive shaft 41, and a rolling gear 43 (refer to a circled drawing denoted by P in FIG. 3) that is formed on a right-hand side surface of the take-up-side gear 42. The rolling gear 43 makes up a reverse rotation preventive mechanism 50, which will be described later. The take-up-side support shaft 52b is inserted into the take-up bobbin drive shaft 41, and then, the slit in the take-up-side support shaft 5b2 is elastically expanded radially outwards, whereby the take-up-side drive shaft member 40 is prevented from being dislocated. Ribs 41a are formed on an outer circumference of the take-up bobbin drive shaft 41. These ribs 41a are brought into engagement with engaging irregular portions 22a that are formed on an inner circumferential surface of the take-up bobbin 22, whereby the take-up bobbin 22 is driven by the take-up bobbin drive shaft 41. Additionally, the take-up-side gear 42 meshes with the supply-side gear 60. Consequently, a rotational coupling mechanism. 80, which is configured to couple together the supply bobbin drive shaft 31 and the take-up bobbin drive shaft 41 rotatably, is made up of the take-up-side gear and the supply-side gear 60. Then, since the rolling gear 43 is provided coaxially with the take-up bobbin drive shaft 41 and the take-up-side gear 42, the rolling gear 43 is coupled with a rotational system configured by the rotational coupling mechanism 80.

Figure 3:
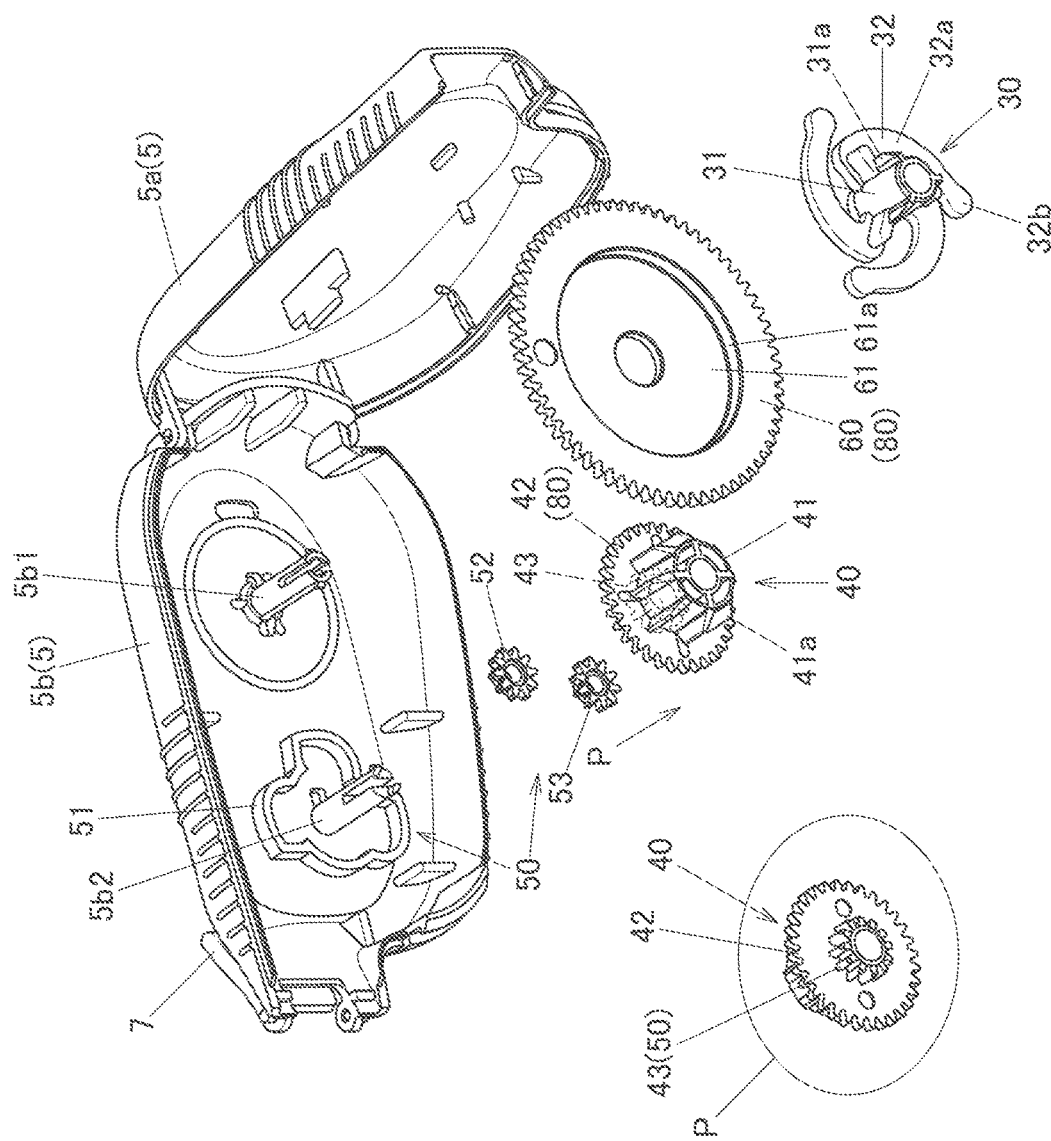
FIG. 3 is an exploded perspective view of the case main body of the film transfer tool according to the embodiment of the invention.

As FIGS. 2 and 3 show, the reverse rotation preventive mechanism 50 for the supply bobbin drive shaft 31 is provided on a right-hand side surface of the take-up-side drive shaft member 40. The reverse rotation preventive mechanism 51 includes a surrounding wall 51 that is formed along an outer circumference of the take-up-side support shaft 5b2, moving gears 52, 53 that are disposed substantially corresponding to the rolling gear 43 within the surrounding wall portion 51, and the rolling gear 43. The take-up-side gear 42 is disposed above an end face of the surrounding wall 51. Namely, a right-hand side surface of the take-up-side gear 42 is brought into sliding contact with the end face of the surrounding wall 51, and the moving gears 52, 53 are covered by the take-up-side gear 42, whereby the moving gears 52, 53 are prevented from falling. Then, the rolling gear 43 of the take-up-side drive shaft member 40 meshes with the moving gears 52, 53.

More specifically, as FIG. 4 shows, when seen from a left-hand side surface, the surrounding wall 51 has protuberant curved portions 51a1, 51a2, 51a3 that are formed at three locations, that is, on an upper side, a lower side and a right side (a rear side) relative to the take-up-side support shaft 5b2. These protuberant curved portions 51a1, 51a2, 51a3 are all formed so as to be protuberant towards a forward rotating side (a side indicated by an arrow F in a forward rotating direction shown in FIG. 4) of the take-up-side drive shaft member 40. Straight-line portions 51b1, 51b2, 51b3 are formed at end portions of the protuberant curved portions 51a1, 51a2, 51a3 in a backward or reverse rotating direction (a side indicated by an arrow R in a reverse rotating direction shown in FIG. 4) so as to extend substantially inwards of the surrounding wall 51. Then, the upper straight-line portion 51b1 and the lower protuberant curved portion 51a2 are connected together by a protuberant arc-shaped connecting portion 51c that protrudes forwards on a left-hand side (a front side) of the take-up-side drive shaft member 40. Similarly, the lower straight-line portion 51b2 and the right protuberant curved portion 51a3 are connected together by a protuberant arc-shaped connecting portion 51c2, and the right straight-line portion 51b3 and the upper protuberant curved portion 51a1 are connected together by a connecting portion 51c3. Then, locking projections 51d1, 51d2, 51d3 are formed at end portions of the straight-line portions 51b1, 51b2, 51b3, respectively, so as to project inwards of the surrounding wall 51 into a triangular shape.

The moving gears 52, 53 are provided in areas S1, S2 that are formed by the upper and lower protuberant curved portions 51a, 51a2 and the straight-line portions 51b1, 51b2, respectively. The areas S1, S2 are formed slightly greater than outside diameters of the moving gears 52, 53. Consequently, the moving gears 52, 53 are allowed to move freely in the corresponding areas S1, S2. Then, in both the areas S1, S2, the moving gears 52, 53 are disposed so that an angle α formed by a line that connects a center OM1 of the moving gear 52 with a center OR of the rolling gear 43 and a line that connects the center OR of the rolling gear 43 with a center OM2 of the moving gear 53 becomes equal to or smaller than 180 degrees. Namely, the moving gears 52, 53 are disposed so that the lines connecting the centers OM1, OR, 0M2 together do not constitute a straight line.

Although the moving gears are not disposed in the area S3 that is formed by the right (the rear) protuberant curved portion 51a3 and the straight-line portion 51b3, a further moving gear can be disposed in the area S3 in addition to the moving gears 52, 53.

Figure 4A:
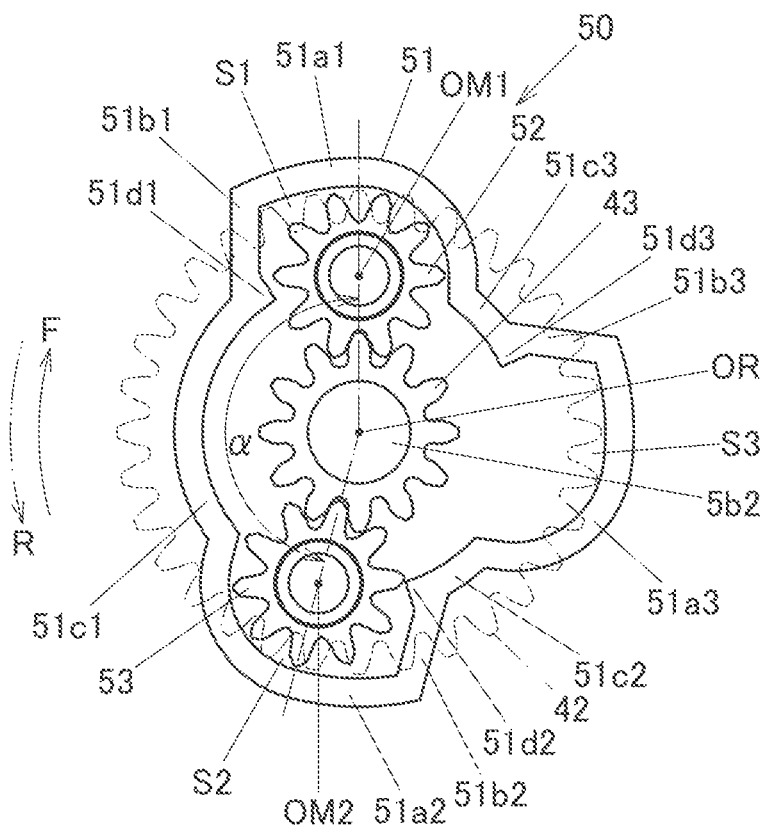
FIG. 4A is a schematic front view showing an operation of a reverse rotation preventive mechanism of the film transfer tool according to the embodiment of the invention, when rotating forwards.
Figure 4B:
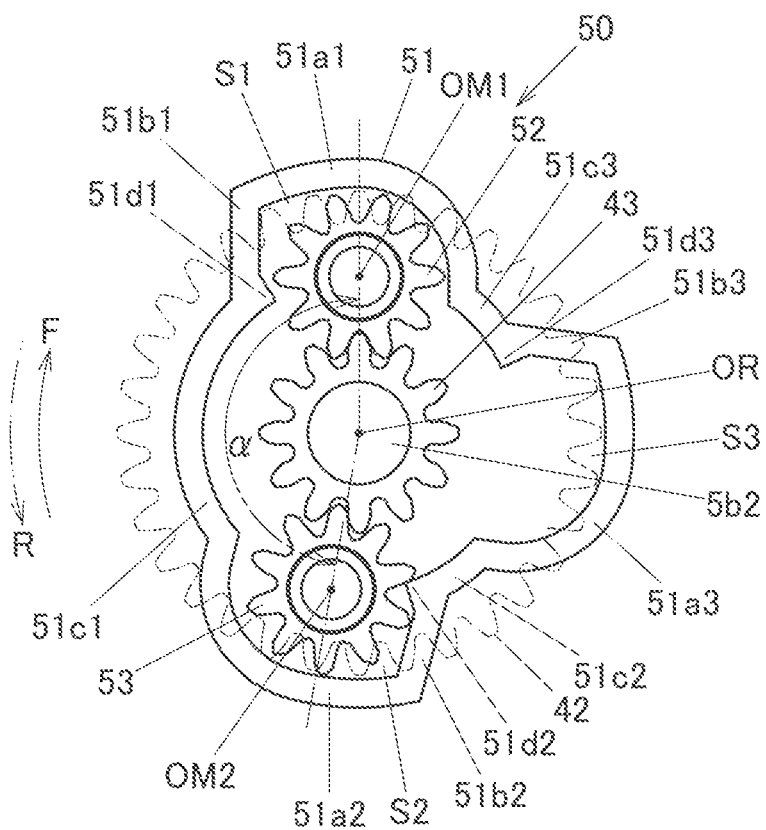
FIG. 4B is a schematic front view showing an operation of the reverse rotation preventive mechanism of the film transfer tool according to the embodiment of the invention, when rotating backwards.

Next, an operation of the reverse rotation preventive mechanism 50 will be described. As FIG. 4A shows, when the film transfer tool 1 is used, the take-up-side drive shaft member 40 rotates in the forward rotating direction F (a clockwise direction in FIG. 4A) about the take-up-side support shaft 5b2. Then, the moving gears 52, 53 rotate about the centers OM1, 0M2, respectively in such a way that their outer circumferences move along inner circumferential surfaces of the protuberant curved portions 51a1, 51a2, respectively, in the areas S1, S2 while kept in sliding touch with the inner circumferential surfaces. Namely, when the film transfer tool 1 is used (when the transfer tape T is transferred to a transfer intended surface), the moving gears 52, 53 rotate idly.

Then, when the take-up-side drive shaft member 40 attempts to rotate in the reverse rotating direction R due to some operation by the user, the moving gears 52, 53 move towards the straight-line portions 51b1, 51b2 within the areas 51, S2, respectively. Then, either of the moving gears 52, 53 comes to mesh with the corresponding one of the locking projections 51d1, 51d2 that are disposed so as to confront the reverse rotating direction R of the rolling gear 43 and is locked thereon. In an example shown in FIG. 4B, the lower moving gear 53 is locked on the locking projection 51d2. When the moving gears 52, 53 are locked in this way, a reverse rotation of the rolling gear 43 is restricted, whereby the rotational coupling mechanism 80 that operates in association with the rolling gear 43, the take-up bobbin 22 and the supply bobbin 21 are also restricted from rotating reversely. In addition, as this occurs, since the moving gears 52, 53 are disposed so that the angle α does not become greater than 180 degrees, there is no such situation that the two moving gears 52, 53 are locked on the corresponding locking projections 51d1, 51d2 at the same time. Consequently, since either of the moving gears 52, 53 comes first to mesh with the corresponding one of the locking projections 51d1, 51d2 to be locked thereon, it is possible to shorten a length of time spent from a time when the rolling gear 43 is started to rotate in the reverse rotating direction R to a time when the rolling gear 43 (the take-up bobbin 22) is started to be restricted from rotating in the reverse rotating direction R.

Then, in the reverse rotation preventive mechanism 50 of the film transfer tools 1, the rolling gear 43 and the moving gears 52, 53 are formed by using gears including teeth formed of a normal involute curve, and the supply-side gear 60 and the take-up-side gear 42 can also be formed by using gears including teeth formed of a normal involute curve. Consequently, costs spent fabricating such gears are not increased, and a special design does not have to be made for the teeth of the gears, either. Then, in the reverse rotation preventive mechanism that is formed by using the conventional ratchet pawl and ratchet teeth, the flicking noise is generated when the ratchet teeth flick the ratchet pawl. However, in the reverse rotation preventive mechanism 50 of this embodiment, such noise is never generated, and hence, the film transfer tool 1 can be used in a quiet office or class room.

Thus, while the embodiment of the invention has been described heretofore, the invention is not limited by the embodiment but can be carried out in various forms. For example, in the embodiment, although the film transfer tool 1 is configured to be used together with the replaceable refill 20, the invention is not limited thereto. The invention can also be applied to a film transfer tool in which the supply bobbin 21 and the take-up bobbin 22 cannot be replaced. As this occurs, although in the embodiment, the supply bobbin drive shaft and the take-up bobbin drive shaft are made up of the supply bobbin drive shaft 31 of the supply-side drive shaft member 30 and the take-up bobbin drive shaft 41 of the take-up-side drive shaft member 40, respectively, in the film transfer tool in which the supply bobbin 21 and the take-up bobbin 22 cannot be replaced, a supply bobbin drive shaft and a take-up bobbin drive shaft can be provided integrally with a supply bobbin and a take-up bobbin, respectively. Namely, the supply bobbin drive shaft and the take-up bobbin drive shaft can be provided integrally with or separately from other members.

Although the rotational coupling mechanism 80 is made up of the supply-side gear 60 and the take-up side gear 42, the invention is not limited thereto. The supply bobbin drive shaft and the take-up bobbin drive shaft can be configured so as to be coupled together rotationally by providing an intermediate gear between the supply-side gear and the take-up-side gear or providing a belt driving mechanism.

Although in the embodiment, the supply bobbin drive shaft 31 is connected to the rotational coupling mechanism 80 via the clutch mechanism 7 (the clutch device 70), the invention is not limited thereto. The clutch mechanism can be provided on either of the supply bobbin 21 and the take-up bobbin 22 (or may be included in the rotational coupling mechanism). As described in this embodiment, the internal space of the case main body 5 can be used effectively by providing the clutch mechanism on the supply bobbin 21 side and providing the reverse rotation preventive mechanism 50 on the take-up bobbin 22 side.

Although the moving gears 52, 53 are disposed so as to move over the predetermined range around the rolling gear 43 by being restricted by the surrounding wall 51, the invention is not limited thereto. The movable ranges of the moving gears 52, 53 can also be restricted by a plurality of pins that are erected from the case main body 5. However, with the surrounding wall 51, the movable ranges of the moving gears 52, 53 can be restricted by the simple configuration, and the locking projections 51*d*1, 51*d*2 can be formed easily.

Although in the embodiment, the number of moving gears is two, as long as one or more moving gears are disposed, the reverse rotation preventive mechanism according to the invention can be formed. As described in this embodiment, the reverse rotation preventive mechanism 50 can be operated in a more ensured fashion by disposing the moving gears 52, 53 so as to substantially correspond to the rolling gear 43.

What is claimed is:

1. A film transfer tool comprising:
    a case main body;
    a supply bobbin drive shaft provided in the case main body and configured to drive a supply bobbin around which an unused transfer tape is wound;
    a take-up bobbin drive shaft provided in the case main body and configured to drive a take-up bobbin around which a used portion of the transfer tape is wound;
    a rotational coupling mechanism configured to couple the supply bobbin drive shaft and the take-up bobbin drive shaft together rotationally; and
    a reverse rotation preventive mechanism configured to prevent a reverse rotation of the rotational coupling mechanism,
    wherein the reverse rotation preventive mechanism has:
        a rolling gear configured to be coupled to a rotational system made up of the supply bobbin drive shaft, the take-up bobbin drive shaft and the rotational coupling mechanism;
        a moving gear disposed so as to move over a predetermined range defined around the rolling gear and configured to mesh with the rolling gear; and
        a locking projection disposed to confront a reverse rotating direction of the rolling gear and configured to lock the moving gear.

2. The film transfer tool according to claim 1,
    wherein the reverse rotation preventive mechanism has two moving gears and two locking projections, wherein the two moving gears are disposed so as to mesh with the rolling gear on opposite sides of the rolling gear, and the two locking projections are disposed so that each locking projection prevents reverse rotating of a respective one of the two moving gears.

3. The film transfer tool according to claim 2,
    wherein the two moving gears are made to move over a predetermined range by a surrounding wall formed on an inner surface of the case main body, and the locking projections are formed so as to project from the surrounding wall.

4. The film transfer tool according to claim 3,
    wherein the supply bobbin drive shaft connects to the rotational coupling mechanism via a clutch mechanism,
    wherein the rotational coupling mechanism has a take-up-side gear that is provided on the take-up bobbin drive shaft, and
    wherein the rolling gear is provided on the take-up bobbin drive shaft, and the take-up-side gear is disposed above an end face of the surrounding wall.

5. The film transfer tool according to claim 1,
    wherein the moving gear is made to move over a predetermined range by a surrounding wall formed on an inner surface of the case main body, and the locking projection is formed so as to project from the surrounding wall.

6. The film transfer tool according to claim 5,
    wherein the supply bobbin drive shaft connects to the rotational coupling mechanism via a clutch mechanism,
    wherein the rotational coupling mechanism has a take-up-side gear that is provided on the take-up bobbin drive shaft, and
    wherein the rolling gear is provided on the take-up bobbin drive shaft, and the take-up-side gear is disposed above an end face of the surrounding wall.

* * * * *